US010957214B2

(12) United States Patent
Clark et al.

(10) Patent No.: US 10,957,214 B2
(45) Date of Patent: *Mar. 23, 2021

(54) MANAGING ANSWER FEASIBILITY

(71) Applicant: International Business Machines Corporation, Armonk, NY (US)

(72) Inventors: Adam T. Clark, Mantorville, MN (US); Jeffrey K. Huebert, Byron, MN (US); Aspen L. Payton, Byron, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/414,725

(22) Filed: May 16, 2019

(65) Prior Publication Data

US 2019/0272768 A1 Sep. 5, 2019

Related U.S. Application Data

(63) Continuation of application No. 14/739,022, filed on Jun. 15, 2015, now Pat. No. 10,347,147, which is a (Continued)

(51) Int. Cl.
*G09B 7/02* (2006.01)
*G09B 7/00* (2006.01)
(Continued)

(52) U.S. Cl.
CPC .......... *G09B 7/02* (2013.01); *G06F 16/3329* (2019.01); *G06F 40/30* (2020.01); *G06N 5/022* (2013.01); *G09B 7/00* (2013.01)

(58) Field of Classification Search
CPC ......... G09B 7/02; G09B 7/00; G06F 17/2785; G06F 17/30654; G06F 19/363; G06F 17/30867

See application file for complete search history.

(56) References Cited

U.S. PATENT DOCUMENTS 7,409,335 B1 8/2008 Horvitz et al.
7,418,443 B2 8/2008 Yoshimura et al.
(Continued)

OTHER PUBLICATIONS

Agarwal, A., et al., "Learning to Rank for Robust Question Answering", CIKM'12, Oct. 29-Nov. 2, 2012, Maui, HI, USA. 10 pages. Copyright 2012 ACM 978-1-4503-1156-4/12/10.

(Continued)

*Primary Examiner* — Kamran Afshar
*Assistant Examiner* — Ying Yu Chen
(74) *Attorney, Agent, or Firm* — Jay Wahlquist

(57) ABSTRACT

A system, a method, and a computer program product for managing answer feasibility in a Question and Answering (QA) system. A set of candidate situations is established. The set of candidate situations corresponds to a first set of answers. A QA system establishes the set of candidate situations by analyzing a corpus. The first set of answers will answer a question. The QA system identifies a subset of the set of candidate situations. The subset of candidate situations corresponds to a portion of contextual data. The portion of contextual data is from a set of contextual data. The set of contextual data relates to the question. The question-answering system determines a set of answer feasibility factors. The set of answer feasibility factors is determined using the subset of candidate situations. The set of answer feasibility factors indicates the feasibility of the answers in the first set of answers.

11 Claims, 4 Drawing Sheets

Related U.S. Application Data continuation of application No. 14/580,376, filed on Dec. 23, 2014, now Pat. No. 10,347,146.

(51) Int. Cl.
  *G06F 16/332* (2019.01)
  *G06F 40/30* (2020.01)
  *G06N 5/02* (2006.01)

(56) References Cited

U.S. PATENT DOCUMENTS

| | | | |
|---|---|---|---|
| 7,856,350 | B2 | 12/2010 | Zhou et al. |
| 8,055,675 | B2 | 11/2011 | Higgins et al. |
| 8,468,143 | B1 | 6/2013 | Oztekin et al. |
| 8,631,001 | B2 | 1/2014 | Lawrence et al. |
| 8,700,544 | B2 | 4/2014 | Sontag et al. |
| 8,738,365 | B2 | 5/2014 | Ferrucci et al. |
| 8,904,164 | B2 | 12/2014 | Ferren |
| 10,353,904 | B2 * | 7/2019 | Enders ............... G06F 16/2477 |
| 2011/0208730 | A1 | 8/2011 | Jiang et al. |
| 2012/0041950 | A1 | 2/2012 | Koll |
| 2012/0253825 | A1 | 10/2012 | Di Fabbrizio |
| 2013/0171605 | A1 | 7/2013 | Tang |
| 2013/0262501 | A1 | 10/2013 | Kuchmann-Beauger |
| 2014/0057241 | A1 | 2/2014 | Rapp et al. |
| 2014/0108307 | A1 | 4/2014 | Raghunathan |
| 2014/0278363 | A1 | 9/2014 | Allen et al. |
| 2014/0280087 | A1 | 9/2014 | Isensee et al. |
| 2014/0309990 | A1 | 10/2014 | Gandrabur et al. |
| 2014/0337329 | A1 | 11/2014 | Brown et al. |
| 2014/0358890 | A1 | 12/2014 | Chen |
| 2016/0179902 | A1 | 6/2016 | Clark |
| 2016/0180728 | A1 | 6/2016 | Clark |

OTHER PUBLICATIONS

Epstein, E., et al., "Making Watson fast", IBM J. RES. & DEV. Vol. 56 No. 3/4 Paper May 15/Jul. 2012. 12 pages. Digital Object Identifier: 10.1147/JRD.2012.2188761, Copyright 2012 by International Business Machines Corporation.

Kalyanpur, A., et al., "Fact-based question decomposition in DeepQA", IBM J. RES. & DEV. Vol. 56 No. 3/4 Paper May 13/Jul. 2012. Digital Object Identifier: 10.1147/JRD.2012.2188934. 11 pages. Copyright 2012 by International Business Machines Corporation.

List of IBM Patents or Patent Applications Treated as Related, May 15, 2019, 2 pages.

Song et al., "Modeling knowledge need awareness using the problematic situations elicited from questions and answers", Dec. 6, 2014, Knowledge-Based Systems 75 (2015), pp. 173-183.

Tanca, L., et al. "Context-aware system design: a data-oriented perspective", PEDiGREE2 group@Politecnico di Milano, Dipartimento di Elettronica e Informazione. Mar. 27, 2012. 70 pages.

Xu, J., et al., "Answer Selection and Confidence Estimation", AAAI Technical Report SS-03-07.4 pages. Copyright © 2002.

* cited by examiner

MANAGING ANSWER FEASIBILITY

BACKGROUND

The present disclosure relates to computer systems, and more specifically, to managing answer feasibility in a question-answering system. With the increased usage of computing networks, such as the Internet, humans can be inundated and overwhelmed with the amount of information available to them from various structured and unstructured sources. However, information gaps can occur as users try to piece together what they can find that they believe to be relevant during searches for information on various subjects. To assist with such searches, recent research has been directed to generating Question and Answer (QA) systems which may take an input question, analyze it, and return results to the input question. QA systems provide mechanisms for searching through large sets of sources of content (e.g., electronic documents) and analyze them with regard to an input question to determine an answer to the question.

SUMMARY

Aspects of the disclosure include managing answer feasibility in a Question and Answering (QA) system. The system, method, and the computer program product include establishing a set of candidate situations. The set of candidate situations may correspond to a first set of answers. A question-answering system may establish the set of candidate situations by analyzing a corpus. The first set of answers may answer a question. The question-answering system may identify a subset of the set of candidate situations. The subset of candidate situations may correspond to a portion of contextual data. The portion of contextual data can be from a set of contextual data. The set of contextual data may relate to the question. The question-answering system may determine a set of answer feasibility factors. The set of answer feasibility factors may be determined using the subset of candidate situations. The set of answer feasibility factors may indicate the feasibility of the answers in the first set of answers.

In embodiments, aspects of the disclosure are directed toward receiving an input. The input may include the question. The input may also include the set of contextual data/information. The set of contextual data may relate to with the question. A question-answering system may generate a first set of answers. The question-answering system may generate the first set of answers by analyzing a corpus. The question-answering system may generate the second set of answers. The second set of answers can be generated using the set of answer feasibility factors.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
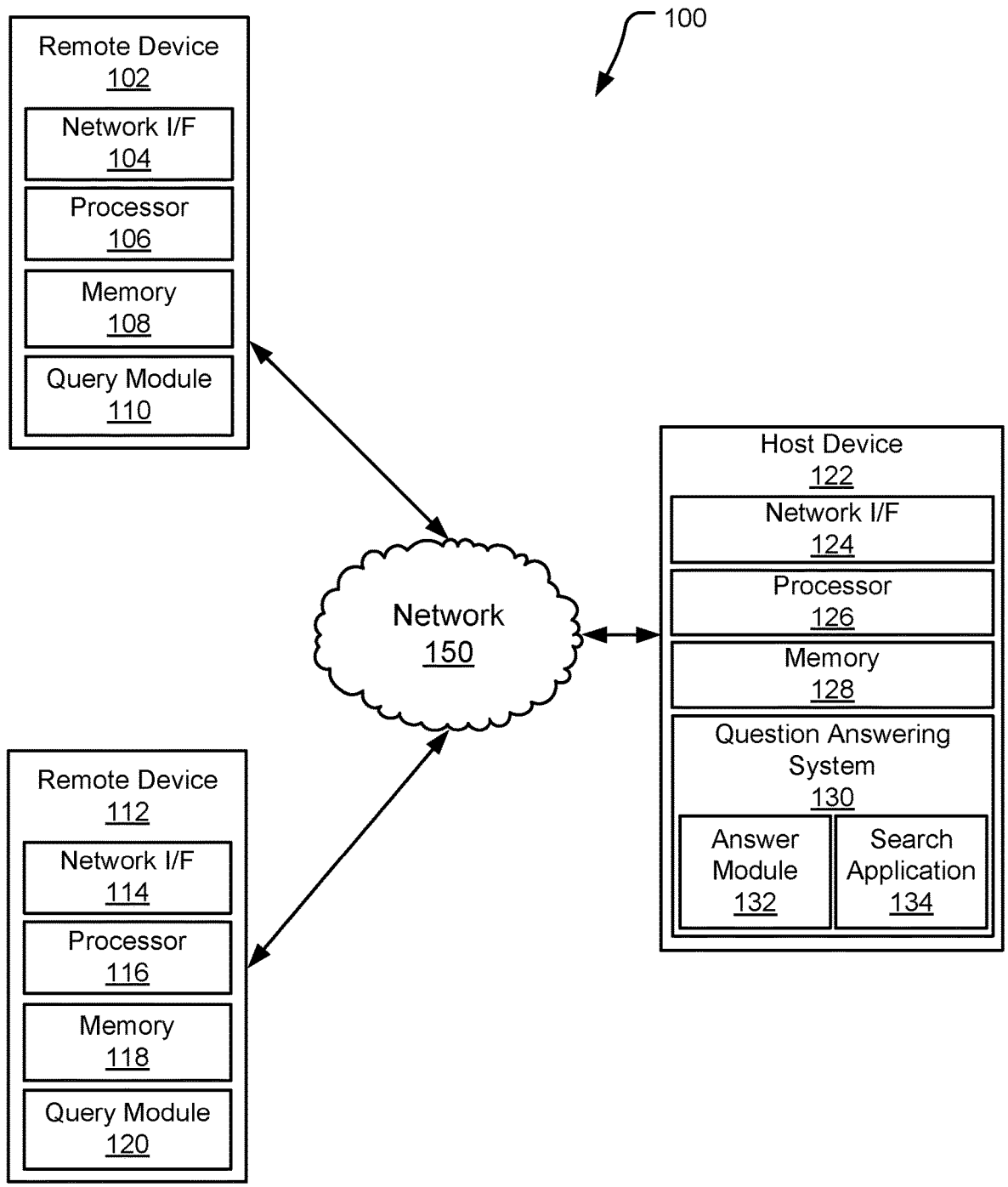
FIG. 1 depicts a block diagram of an example computing environment for use with a question-answering (QA) system, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure include a system and method for managing answer feasibility. The management of answer feasibility may be used by question-answering systems, which receive a question and generate "candidate" answers for the question. Question-answering systems can select generated candidate answers based upon the relevance of the answers. Sometimes, the most relevant answer may be less feasible than other answers, given the context of the question. The system and method may discover how feasible the answers are and evaluate the candidate answers based upon this feasibility.

In some instances, question-answering systems may use relevancy to generate and evaluate candidate answers. For example, if a question is "how should I treat bee stings," the most relevant answer may be "use anti-histamine" or "put ice on bee sting." In certain situations, the most relevant answer may not be the most feasible answer for the question. For example, if the question above related to a person who was allergic to bees, the use of anti-histamine or ice may not be a feasible answer, though the two are still highly relevant. Instead, a feasible answer may be "use an epinephrine auto-injector." As such, determining the feasibility of candidate answers may result in performance benefits in the selection of candidate answers.

In order to determine the feasibility of answers, the question-answering system may use contextual information related to the question. Certain question-answering systems can use this contextual information along with the question to initially determine relevant candidate answers. For example, if a user submitted the question "what should I do today" to a question-answering system, the system might query a profile of the user to ascertain that the user is an alumni of a university in Alabama, and a fan of Alabama's football team. As a result of this contextual data, the question-answering system may generate an answer of "go to today's Alabama football game." However, embodiments which determine candidate answers based on relevancy may generate unfeasible answers, such as the example above if the user lived in California and lacked means to quickly travel to Alabama.

Though the question-answering system may gather the contextual information when the question is received, in instances this initial contextual data may be incomplete. For example, to continue the Alabama illustration, the question-answering system may lack contextual information regarding the user's potential means to arrive in Alabama. In this case, the question-answering system may gather this information via requests to the user or from external databases (e.g., a bank account or vehicle database).

In embodiments, the question-answering system may generate multiple candidate answers. The question-answering system may score the answers with a confidence score to indicate the certainty or reliability of a particular answer in relation to the other answers. In such embodiments, the question-answering system may first generate scores relative to the computed relevance of an answer, and then update scores as necessary to reflect the feasibility of the answers in the given situation. Put differently, once a given situation is quantified with contextual information, the correctness of a candidate answer can be augmented by the feasibility based on the current user and environment constraints. In this way the question-answering system can have performance benefits in scoring answers for a question by quantifying and qualifying the environment of the question.

Aspects of the disclosure include establishing a set of candidate situations. The set of candidate situations may correspond to a first set of answers. A question-answering system may establish the set of candidate situations by analyzing a corpus. The first set of answers may answer a question. The question-answering system may identify a subset of the set of candidate situations. The subset of candidate situations may correspond to a portion of contextual data. The portion of contextual data can be from a set of contextual data. The set of contextual data may relate to the question. The question-answering system may determine a set of answer feasibility factors. The set of answer feasibility factors may be determined using the subset of candidate situations. The set of answer feasibility factors may indicate the feasibility of the answers in the first set of answers.

In embodiments, aspects of the disclosure are directed toward receiving an input. The input may include the question. The input may also include the set of contextual data/information. The set of contextual data may relate to with the question. A question-answering system may generate a first set of answers. The question-answering system may generate the first set of answers by analyzing a corpus. The question-answering system may generate the second set of answers. The second set of answers can be generated using the set of answer feasibility factors.

In embodiments, the first set of answers may include a first set of media and a first set of scores. Scores of the first set of scores may map to answers of the first set of answers. The set of answer feasibility factors may include a set of score modifiers. The set of score modifiers may correspond to scores of the first set of scores. The question-answering system may apply the set of score modifiers to the first set of scores. Applying the modifiers to the first set of scores may generate a second set of scores. The question-answering system may map the second set of scores to a second set of media. The second set of media may be established using the first set of media. In embodiments, while generating answers, the question-answering system may collect a set of evidentiary data related to the answers. Embodiments may see performance benefits by checking for feasibility of answers after generating answers and comparing contextual data to gathered evidentiary data.

Referring now to FIG. 1 a block diagram of an example computing environment 100 for use with a QA system can be seen, according to embodiments of the present disclosure. In some embodiments, the computing environment 100 can include one or more remote devices 102, 112 and one or more host devices 122. Remote devices 102, 112 and host device 122 can be distant from each other and communicate over a network 150. In embodiments, the host device 122 can be a central hub from which remote devices 102, 112 establish a communication connection. In embodiments, the host device and remote devices can be configured in various suitable relationships (e.g., in a peer-to-peer or other relationship).

In some embodiments, the network 150 can be implemented by suitable communications media (e.g., wide area network (WAN), local area network (LAN), Internet, and Intranet). In some embodiments, remote devices 102, 112 and host devices 122 can be local to each other, and communicate via appropriate local communication medium (e.g., local area network (LAN), hardwire, wireless link, Intranet). In some embodiments, the network 150 can be implemented within a cloud computing environment, or using one or more cloud computing services. Consistent with various embodiments, a cloud computing environment can include a network-based, distributed data processing system that provides one or more cloud computing services. Further, a cloud computing environment can include multiple computers (e.g., hundreds or thousands of them or more), disposed within one or more data centers and configured to share resources over the network 150.

In some embodiments, host device 122 can include a QA system 130 having a search application 134 and an answer module 132. The search application 134 can be configured to search one or more databases or other computer systems for content that is related to an input query by a user at a remote device 102, 112.

In some embodiments, remote devices 102, 112 can enable users to submit input queries (e.g., search requests or other user queries) to host devices 122 to retrieve search results. For example, the remote devices 102, 112 can include a query module 110, 120 (e.g., in the form of a web browser or other suitable software module) and present a graphical user interface or other interface (command line prompts, menu screens) to solicit queries from users for submission to one or more host devices 122 and to display answers/results obtained from the host devices 122 in relation to such user queries.

Consistent with various embodiments, host device 122 and remote devices 102, 112 can be computer systems, and can each be equipped with a display or monitor. The computer systems can include at least one processor 106, 116, 126; memories 108, 118, 128; internal or external network interface or communications devices 104, 114, 124 (e.g., modem, network interface cards); optional input devices (e.g., a keyboard, mouse, touchscreen, or other input device); and commercially available or custom software (e.g., browser software, communications software, server software, natural language processing software, search engine and/or web crawling software, filter modules for filtering content based upon predefined criteria). In some embodiments, the computer systems can include servers, desktops, laptops, and hand-held devices. In addition, the answer module 132 can include one or more modules or units to perform the various functions of embodiments as described below, and can be implemented by a combination of software and/or hardware modules or units.

Figure 2:
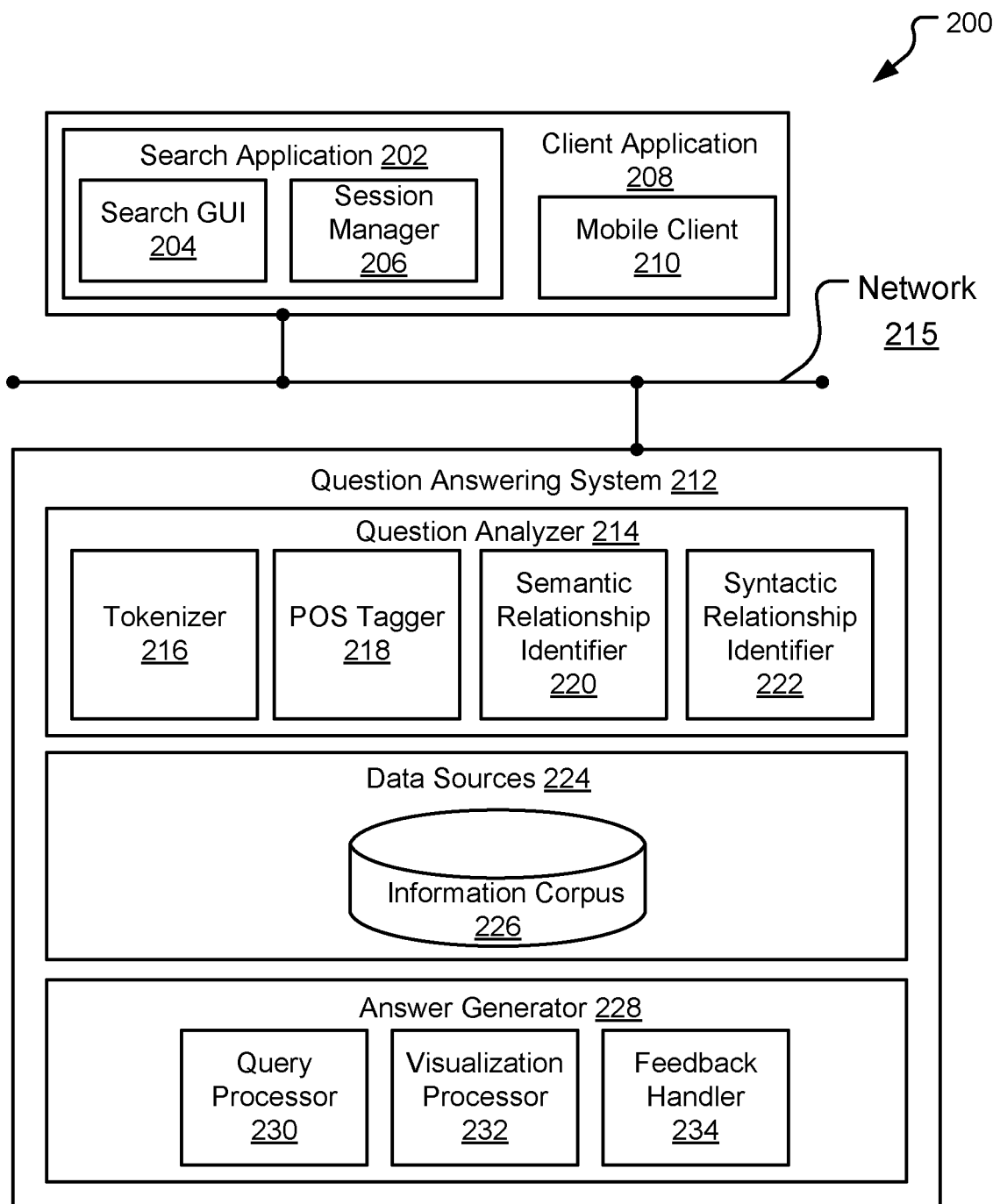
FIG. 2 depicts a block diagram of an example QA system configured to generate parameters in response to one or more input queries, according to embodiments of the present disclosure.

Referring now to FIG. 2 a block diagram of a QA system can be seen, according to embodiments of the present disclosure. Aspects of FIG. 2 are directed toward a system architecture 200, including a QA system 212 to generate a group of answers in response to an input query. In some embodiments, one or more users can send requests for information to QA system 212 using a remote device (such as remote devices 102, 112 of FIG. 1). The remote device can include a client application 208 which can include one or more entities operable to generate information that is dispatched to QA system 212 via network 215. QA system 212 can be able to perform methods and techniques for responding to the requests sent by the client application 208. In some embodiments, the information received at QA system 212 can correspond to input queries received from users, where the input queries can be expressed in natural language, or images, or other forms.

An input query (similarly referred to herein as a question) can be one or more words that form a search term or request for data, information, or knowledge. A question can be expressed in the form of one or more keywords. Questions can include various selection criteria and search terms. A question can be composed of complex linguistic features in addition to keywords. However, a keyword-based search for answers can also be possible. In some embodiments, using restricted syntax for questions posed by users can be enabled. The use of restricted syntax can result in a variety of alternative expressions that assist users in better stating their needs. In some embodiments, questions can be implied (rather than explicit) questions. Furthermore, in some embodiments, questions can be audio-type (e.g., spoken-word recordings, music, scientific sound recordings), video-type (e.g., a film, a silent movie, a video of a person asking a detailed question), image-type (e.g., a picture, a photograph, a drawing), or other type that can be received and processed by the QA system.

In some embodiments, client application 208 can operate on a variety of devices. Such devices can include, but are not limited to, mobile and hand-held devices (e.g., laptops, mobile phones, personal or enterprise digital assistants, and the like), personal computers, servers, or other computer systems that can access the services and functionality provided by QA system 212. In some embodiments, client application 208 can include one or more components, such as a mobile client 210. Mobile client 210, acting as an agent of client application 208, can dispatch user query requests to QA system 212.

Consistent with various embodiments, client application 208 can also include a search application 202, either as part of mobile client 210 or separately, that can perform several functions, including some or all of the above functions of mobile client 210 listed above. For example, in some embodiments, search application 202 can dispatch requests for information to QA system 212. In some embodiments, search application 202 can be a client application to QA system 212. Search application 202 can send requests for answers to QA system 212. Search application 202 can be installed on a personal computer, a server, or other computer system.

In some embodiments, search application 202 can include a search graphical user interface (GUI) 204 and session manager 206. In such situations, users can be able to enter questions in search GUI 204. In some embodiments, search GUI 204 can be a search box or other GUI component, the content of which can represent a question to be submitted to QA system 212. Users can authenticate to QA system 212 via session manager 206. In some embodiments, session manager 206 can keep track of user activity across sessions of interaction with the QA system 212. Session manager 206 can also keep track of what questions are submitted within the lifecycle of a session of a user. For example, session manager 206 can retain a succession of questions posed by a user during a session. In some embodiments, answers produced by QA system 212 in response to questions posed throughout the course of a user session can also be retained. Information for sessions managed by session manager 206 can be shared between various computer systems and devices.

In some embodiments, client application 208 and QA system 212 can be communicatively coupled through network 215, e.g., the Internet, intranet, or other public or private computer network. In some embodiments, QA system 212 and client application 208 can communicate by using Hypertext Transfer Protocol (HTTP) or Representational State Transfer (REST) calls. In some embodiments, QA system 212 can reside on a server node. Client application 208 can establish server-client communication with QA system 212 or vice versa. In some embodiments, the network 215 can be implemented within a cloud computing environment, or using one or more cloud computing services.

Consistent with various embodiments, QA system 212 can respond to a request for information sent by client applications 208 (i.e., question posed by a user). QA system 212 can generate a group of answers (i.e. answers) in response to the request. In some embodiments, QA system 212 can include a question analyzer 214, data sources 224, and Answer Generator 228. Question analyzer 214 can be a computer module that analyzes the received questions. Question analyzer 214 can perform various methods and techniques for analyzing the questions (syntactic analysis, semantic analysis, image recognition analysis). In some embodiments, question analyzer 214 can parse received questions. Question analyzer 214 can include various modules to perform analyses of received questions. For example, computer modules that question analyzer 214 can encompass include, but are not limited to, a tokenizer 216, part-of-speech (POS) tagger 218, semantic relationship identifier 220, and syntactic relationship identifier 222.

In some embodiments, tokenizer 216 can be a computer module that performs lexical analysis. Tokenizer 216 can convert a sequence of characters into a sequence of tokens. A token can be a string of characters typed by a user and categorized as a meaningful symbol. Further, in some embodiments, tokenizer 216 can identify word boundaries in an input query and break the question or text into its component parts such as words, multiword tokens, numbers, and punctuation marks. In some embodiments, tokenizer 216 can receive a string of characters, identify the lexemes in the string, and categorize them into tokens.

Consistent with various embodiments, POS tagger 218 can be a computer module that marks up a word in a text to correspond to a particular part of speech. POS tagger 218 can read a question or other text in natural language and assign a part of speech to each word or other token. POS tagger 218 can determine the part of speech to which a word corresponds based on the definition of the word and the context of the word. The context of a word can be based on its relationship with adjacent and related words in a phrase, sentence, question, or paragraph. In some embodiments, the context of a word can be dependent on one or more previously posed questions. Examples of parts of speech that can be assigned to words include, but are not limited to, nouns, verbs, adjectives, adverbs, and the like. Examples of other part of speech categories that POS tagger 218 can assign include, but are not limited to, comparative or superlative adverbs, wh-adverbs, conjunctions, determiners, negative particles, possessive markers, prepositions, wh-pronouns, and the like. In some embodiments, POS tagger 218 can tag or otherwise annotate tokens of a question with part of speech categories. In some embodiments, POS tagger 218 can tag tokens or words of a question to be parsed by QA system 212.

In some embodiments, semantic relationship identifier 220 can be a computer module that can identify semantic relationships of recognized entities (e.g., words, phrases) in questions posed by users. In some embodiments, semantic relationship identifier 220 can determine functional dependencies between entities and other semantic relationships.

Consistent with various embodiments, syntactic relationship identifier 222 can be a computer module that can identify syntactic relationships in a question composed of tokens posed by users to QA system 212. Syntactic relationship identifier 222 can determine the grammatical structure of sentences, for example, which groups of words are associated as "phrases" and which word is the subject or object of a verb. Syntactic relationship identifier 222 can conform to formal grammar.

In some embodiments, question analyzer 214 can be a computer module that can parse a received user query and generate a corresponding data structure of the user query. For example, in response to receiving a question at QA system 212, question analyzer 214 can output the parsed question as a data structure. In some embodiments, the parsed question can be represented in the form of a parse tree or other graph structure. To generate the parsed question, question analyzer 214 can trigger computer modules 216-222. Additionally, in some embodiments, question analyzer 214 can use external computer systems for dedicated tasks that are part of the question parsing process.

In some embodiments, the output of question analyzer 214 can be used by QA system 212 to perform a search of a set of (i.e., one or more) corpora to retrieve information to answer a question posed by a user. As used herein, a corpus can refer to one or more data sources. In some embodiments, data sources 224 can include databases, information corpora, data models, and document repositories. In some embodiments, the data source 224 can include an information corpus 226. The information corpus 226 can enable data storage and retrieval. In some embodiments, the information corpus 226 can be a storage mechanism that houses a standardized, consistent, clean and integrated form of data. The data can be sourced from various operational systems. Data stored in the information corpus 226 can be structured in a way to specifically address reporting and analytic requirements. In some embodiments, the information corpus can be a relational database. In some example embodiments, data sources 224 can include one or more document repositories.

In some embodiments, Answer Generator 228 can be a computer module that generates the group of answers in response to posed questions. Examples of answers generated by Answer Generator 228 can include, but are not limited to, natural language sentences, reports, charts, or other analytic representation, raw data, web pages, and the like. In some embodiments, answers can be of audio type, image type, or other suitable medium type.

In some embodiments, Answer Generator 228 can include query processor 230, visualization processor 232, and feedback handler 234. When information in the data source 224 matching a parsed question is located, a technical query associated with the pattern can be executed by query processor 230. Based on data retrieved by a technical query executed by query processor 230, visualization processor 232 can be configured to render visualization of the retrieved answers as described herein. The rendered visualization of the answers can represent the answer to the input query. In some embodiments, visualization processor 232 can render visualization in various forms including, but not limited to, images, charts, tables, dashboards, maps, and the like.

Described further herein, the visualization processor 232 can be configured to implement embodiments of the present disclosure. For example, the visualization processor 232 can be configured to sort, based on a set of answer categories, a first set of answers into a first answer category and a second set of answers into a second answer category. The answer categories can be the same or substantially similar as described herein.

Described further herein, the visualization processor 232 can be configured to implement embodiments of the present disclosure. For example, the visualization processor 232 can be configured to establish a set of candidate situations which correspond to a first set of answers for a question. The visualization processor 232 can be configured to identify a subset of the set of candidate situations which corresponds to a set of contextual data associated with the question. The visualization processor 232 can be configured to determine, using the subset of the set of candidate situations, a set of answer feasibility factors for the first set of answers.

In some embodiments, feedback handler 234 can be a computer module that processes feedback from users on answers generated by Answer Generator 228. In some embodiments, users can be engaged in dialog with the QA system 212 to evaluate the relevance of received answers. For example, the Answer Generator 228 could produce the group of answers corresponding to a question submitted by a user. The user could rank each answer according to its relevance to the question. In some embodiments, the feedback of users on generated answers can be used for future question answering sessions.

The various components of the exemplary QA system described above can be used to implement various aspects of the present disclosure. For example, the client application 208 could be used to receive an input query from a user. The question analyzer 214 could, in some embodiments, be used to analyze input queries and to generate the group of answers based on the input query. The Answer Generator 228 could, in some embodiments, be used to analyze the input queries and generate feasibilities of answers for the input queries. The Answer Generator 228 could, in some embodiments, be used to render visualization of the group of answers and feasibilities to generate an answer and feasibility sequence for presentation to the user.

Figure 3:
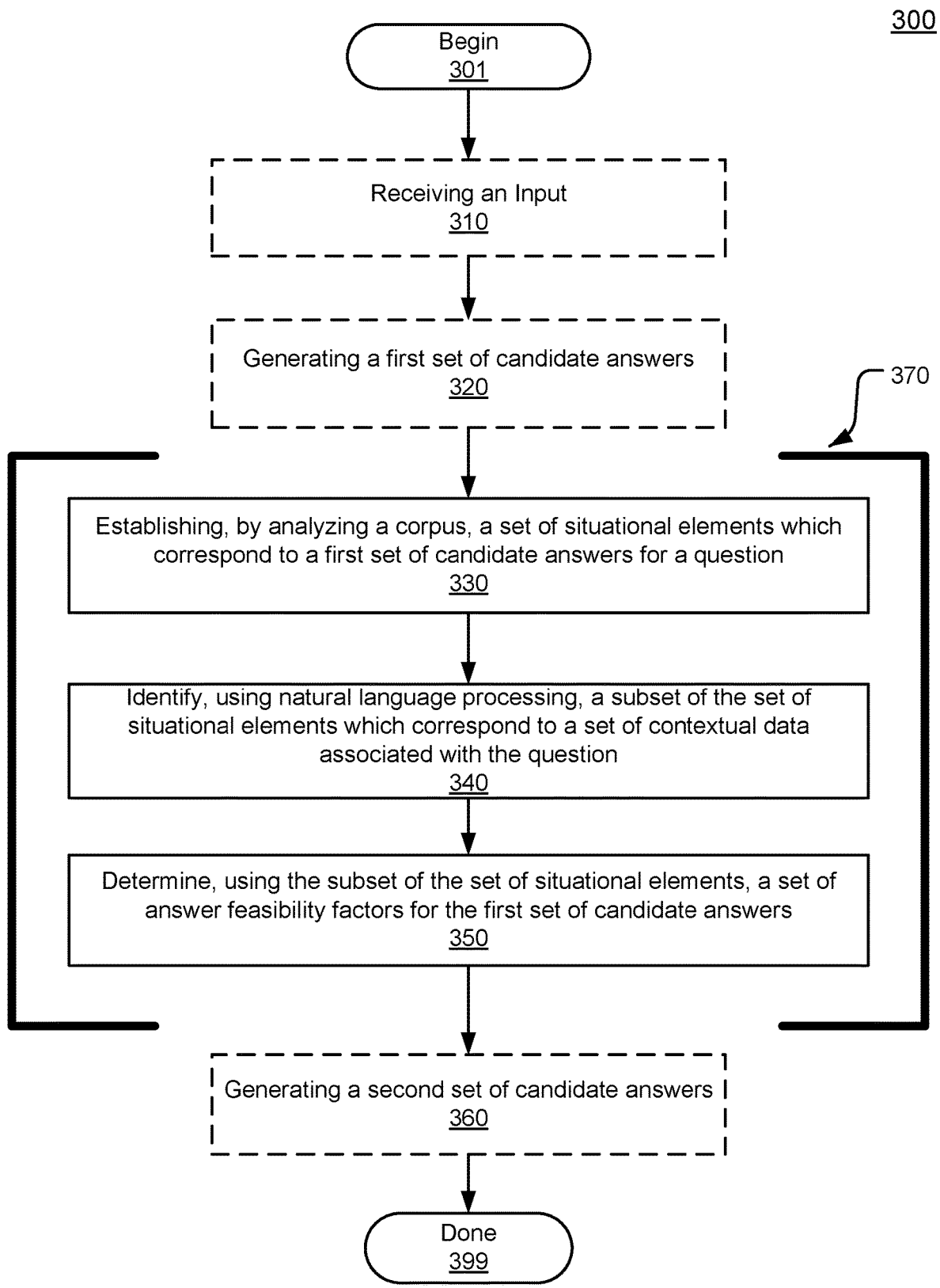
FIG. 3 depicts a method for managing answer feasibility for a question-answering system according to an embodiment.

FIG. 3 is a flowchart illustrating a method 300 for managing answer feasibility in a QA system. The feasibility analysis is depicted within the brackets 370 which contain blocks 330, 340, and 350. Aspects of method 300 may work on a number of operating systems. The method 300 begins at block 301. In embodiments, at block 301 a user may have a question for a QA system. In certain embodiments, the user may submit the question to the QA system. As a result of the specific situation regarding the question, certain answers to the question may be more feasible than other answers.

At block 310 the QA system may receive an input. The input may be a collection of data sent to a question-answering system in order to receive an answer from the question-answering system. The input may include a question and a set of contextual data associated with the question. In embodiments, the set of contextual data is information about the environment of the question which impacts the feasibility/applicability of answers generated by the QA system. For example, if the question is "what should I make for a snack," the contextual data may include the contents of a fridge and pantry. Other potential examples of contextual data include health data (e.g., allergies, medical conditions, biometric data), financial data (e.g., funds available to the user), useful item data (e.g., medical devices, mechanical tools, software applications), global positioning system data, time data (e.g., a deadline or urgency related to the question), or a set of technical data (e.g., specifications on a malfunctioning device). Other types of contextual data are also possible.

In embodiments, the contextual data may be gathered by the user original submission. For example, the user may have submitted the question "what should I make for a snack" and in a comments section included the contents of their fridge and pantry. In embodiments, the QA system may gather contextual data via external databases. For example, if the user submitted the question "what should I make for a snack," the QA system may check a "smart" network-connected fridge for available food items. In embodiments, the QA system could use sensors to gather contextual data. For example, for the question "what should I make for a snack" the QA system may check a thermostat for the temperature to determine if hot chocolate is appropriate.

At block 320 the QA system may generate a first set of answers. In embodiments, the first set of answers is a collection of responses to the question which are generated by the QA system. To generate the answers, the QA system may analyze a corpus using NLP techniques as described herein. In embodiments, the corpus is a collection of organized data which contains sufficient information to mine for answers to the question. In embodiments, the first set of answers may include a first set of media (e.g., text or video answering the question) and a first set of scores (e.g., confidence scores, grades, ranks). In other embodiments, the first set of answers may not be scored until after a feasibility analysis 370 has been completed.

Scores may correspond to a specific answer and may indicate the pertinence of that answer to the question. In certain embodiments, answers may include a set of evidentiary data (e.g., scientific or logical data/documentation detailing when and why an answer may be feasible or relevant for the question). For example, a user may transmit a question of "how do I get home now that my car broke down." The QA system may determine that the answer "call a taxi" is the most relevant answer with a confidence score of 0.9. The answer "call a taxi" may have supporting evidentiary data which includes an article from a car magazine which calculated calling a taxi as the fastest way to get home after a car mishap. This score may not take into account the feasibility of the answer due to contextual evidence (e.g., the user may have no cell phone reception). In certain embodiments, scores may not be generated until after the feasibility analysis 370, at which point the QA system can account for feasibility when generating scores.

In certain embodiments, the QA system may determine to evaluate the feasibility of answers at block 320. In such embodiments, the QA system may map, using natural language processing (NLP) techniques, the question to a subset of the corpus. For example, the QA system may receive a question of "what do I do about my painful molar" and use NLP techniques as described herein to map the question to the "dentistry" subset of the corpus. The subset of the corpus may then be compared to a set of contextually-sensitive categories. In embodiments, contextually-sensitive categories may be areas of the corpus where it is more likely that an answer will be more or less feasible based on contextual data. Examples of contextually sensitive categories may include medical fields (e.g., how do I treat an illness), technical support fields (e.g., how do I fix a computer, how do I fix a car), financial fields (e.g., how do I invest money), or location-dependent fields (e.g., how do I get from location A to location B, what restaurants are near me).

The comparison to contextually-sensitive categories may use concept-matching techniques. Concept matching techniques can include, but are not limited to, semantic similarity, syntactic analysis, and ontological matching. For example, in embodiments, the natural language processor could be configured to parse data to determine semantic features (e.g., word meanings, repeated words, keywords) and/or syntactic features (e.g., word structure, location of semantic features in headings, title). Ontological matching could be used to map semantic and/or syntactic features to a particular concept. The concept can then be used to determine the subject matter. Using concept matching, the QA system may classify the concepts of the question as matching the concepts of the contextually-sensitive category.

After a QA system classifies the concepts as matching, the QA system may proceed with a feasibility analysis 370. For example, the QA system may use NLP techniques to match the question "what do I do about my painful molar" to the concept of "dentistry." "Dentistry" may be identified as a subset of "healthcare," which is itself identified as a contextually sensitive category, prompting the QA system to engage feasibility analysis 370. In certain embodiments there may be a pre-defined list of contextually sensitive categories which includes healthcare as well as technical support, financial, or location based questions. In other embodiments, the QA system may use NLP techniques to identify characteristics of a corpus which suggest contextually-dependent answers. For example, a QA system may determine that healthcare questions often have some answers that are far more feasible when a given condition is present. For another example, a QA system may identify a collection of answers which are all equally relevant and are otherwise indistinguishable.

In certain embodiments, a QA system may allow for a user to select whether or not the QA system may proceed with the feasibility analysis 370. For example, if the user is aware of contextual data which is expected to impact the answer (e.g., the user is in the middle of the desert), the user may input the contextual data in question and begin a feasibility analysis 370. If the user wants to check whether or not an answer is feasible, the user may request to use the analysis 370 simply to see the feasibility results. Other mechanisms for a QA system accepting user requests for feasibility analysis 370 are possible.

At block 330, a set of candidate situations is established. In embodiments, a candidate situation is a portion of data from the corpus which characterizes a situation which will impact the feasibility of an answer if the situation matches the contextual data (e.g., if the described situation of the set of candidate situations matches the actual situation of the question). Put differently, candidate situations are potential scenarios identified by the QA system. These potential scenarios, if realized, can impact the feasibility of an answer. For example, if the question is "how do I treat the flu," the QA might determine potential situations of "being elderly," "being an infant," or "having a pre-existing condition" as scenarios which can impact the feasibility of an answer (e.g., "stay home, rest, and consume plenty of liquids" may be impacted/unfeasible). Throughout the feasibility analysis 370, the QA system may verify if the potential scenarios have been realized—and therein if the feasibility of answers has been impacted—by comparing the candidate situations (e.g., potential scenarios) to the contextual data (e.g., the actual scenario).

The QA system may establish the candidate situations by analyzing a corpus as described herein. For example, if the question "what restaurant should I eat at" is received by the QA system at 310, candidate situations may include a "cost"

element, a "location" element, an "business hours" element, a "gluten-free" element, or any other element which can impact how feasible an answer may be. If a candidate situation is found to apply, the QA system may determine that some answers are more or less feasible. For example, if the "gluten-free" element is identified as corresponding to the contextual data (e.g., the user requires gluten-free food), some answers may be identified as more or less feasible.

In embodiments, each answer may have a multitude of candidate situations corresponding to it. For example, if the question is "how should I fix my computer," answers may include "scan for and remove malware" or "reformat hard drive." Candidate situations associated with "scan for and remove malware" may include "homepage has been changed," "searches taking me to unknown site," "firewall getting automatically turned off," or "excessive pop-ups coming from unknown source." Likewise, candidate situations associated with "reformat hard drive" may include "startup takes longer than two minutes," "shutdown takes longer than two minutes," or "operating system errors on startup and shutdown." As described herein, the QA system may discover that few or none of these candidate situations match the contextual data, and may use these matches or lack thereof to evaluate feasibility.

In certain embodiments, the QA system may search for candidate situations in a corpus which includes the set of evidentiary data from the first set of answers. For example, if the question was "how do I get from Minneapolis to Detroit," evidentiary data may have been gathered which included the costs of different answers, the travel time for different answers, and the objects needed (e.g., functioning car) for different answers. The QA system may use this evidentiary data to establish candidate situations including "flights begin at $300," "driving requires working car," or "trains leave by 8:00." In embodiments, the QA system may select the evidentiary data as the first section of the corpus to check, due to the heightened relevance of information in the evidentiary data in comparison to the rest of the corpus. In certain embodiments, the QA system may only check the evidentiary data for candidate situations. The QA system may have performance benefits from including and prioritizing the existing evidentiary data when establishing candidate situations.

At block 340, a subset of candidate situations is identified. The identified subset may be the portion of candidate situations which corresponds with the contextual data as described herein. Put differently, the subset of candidate situations may be those candidate situations (e.g., potential scenarios) which match the contextual data (e.g., actual scenario), and therein impact feasibility. For example, to continue the "how should I fix my computer" illustration, part of the contextual data may include "startup takes three minutes." The QA system may correspond this with "startup takes longer than two minutes." The QA system may therefore identify "startup takes longer than two minutes" as part of the subset of candidate situations.

The subset of candidate situations may be identified using NLP techniques and concept matching techniques as described herein. For example, using the illustration regarding traveling from Minneapolis to Detroit, contextual data may include "bank balance of $150" and "car in the shop." The QA system may use NLP to match the concept of a bank balance to a working budget and include "planes cost $300" to the subset of candidate situations. The QA system may also use NLP to match the concept of "car in the shop" to a lack of a working car, and may then add "driving requires working car" to the subset of candidate situations.

The subset of candidate situations may be identified using a NLP technique. In embodiments, this NLP technique may include comparing a first set of terms from the candidate situation to a corresponding second set of terms from the set of contextual data. For example, the candidate situation may include a first term of "anaphylaxis," which means a sudden and severe allergic reaction, commonly from insects. Using NLP, aspects of the embodiment may determine that "anaphylaxis" may be analogous to a second term, "bee allergy," from the contextual data. In this way the first and second terms may be classified as belonging to the same linguistic concept.

In embodiments, aspects of the embodiment may detect the absence of contextual data which corresponds to the subset of candidate situations. For example, when a question about a bee sting is processed, the QA system may identify bee allergies as a candidate situation which can have significant impacts on the feasibility of answers. The QA system may also determine that there is no contextual data about allergies of the person who was stung. In response to the lack of the relevant portion of contextual data, the QA system may gather the relevant portion of contextual data. The QA system may gather the necessary contextual data about allergies by checking relevant databases or by querying the user. Other mechanisms for gathering contextual data are possible. Once the portion of contextual data is gathered, the QA system may add the portion to the set of contextual data.

At block 350, a set of answer feasibility factors is determined. In embodiments, the answer feasibility factors indicate the appropriateness/practicality of the answers for the situation in which the question arose. In certain embodiments, the answer feasibility factors may also include evidence for the determined feasibility. Answer feasibility factors may indicate the feasibility of answers by scores (e.g., confidence scores) or modifiers for existing scores.

For example, for a question "how should I invest my money," the contextual data may have included "age 30," "married," "investing for retirement," or "salary of $60,000." The QA systems may have answers of "invest in US bonds," "invest in US markets," "invest in foreign markets," and "invest in US and foreign markets." The QA system may analyze a corpus to identify candidate situation "markets for under 40" which corresponds with substantial evidentiary data indicating that investors under 40 are better served investing in markets. The QA system may also identify candidate situation "diversified portfolio for under 40" which indicates via substantial evidence that a diversified market portfolio with both domestic and foreign investments is preferred for young retirement investors. The QA system may also have identified the candidate situation "diversified portfolio for over $50,000" which has a secondary and less supported portion of evidentiary data which indicates a diversified portfolio is preferred when the investors are making over $50,000 and can accordingly take some risks in certain foreign markets. The QA system may identify all three candidate situations as corresponding to the contextual data. The contextual data "married" may not identified as unnecessary by the QA system.

The QA system may then use these candidate situations to determine feasibility factors. The QA system may quantify the evidence associated with the candidate situation "markets for under 40" and create feasibility scores, raising the feasibility of those answers of which involved markets (e.g., US and foreign markets is scored 0.3, foreign markets is scored 0.3, US markets is scored 0.3, US bonds is scored 0.1). The QA system may next quantify the evidence associated with the candidate situation "diversified portfolio for under 40" and raise the feasibility of the answer which involved a diversified portfolio (e.g., US and foreign markets is scored 0.65, foreign markets is scored 0.15, US markets is scored 0.15, US bonds is scored 0.05). The QA system may quantify the evidence associated with the third candidate situation "diversified portfolio for over $50,000" and minimally raise the feasibility of the answer which involved a diversified portfolio to reflect the comparatively poorer supporting data (e.g., US and foreign markets is scored 0.70, foreign markets is scored 0.13, US markets is scored 0.13, US bonds is scored 0.04). In embodiments all candidate situations may be accounted for simultaneously or in different orders.

In embodiments, the feasibility factors may use and include the evidentiary data which is associated with the subset of candidate situations. For example, in the "how should I invest my money" illustration, the subset of situations may have included a situation "under the age of 40." The "under the age of 40" situation may reduce the feasibility of the answer "invest in US bonds" (e.g., if a user was under the age of 40 it was less feasible/applicable for the user to invest in US bonds). The situation may have been associated with evidentiary data (e.g., evidentiary data) from the corpus which included articles and books on how those who are able to invest for long periods of time were more likely to accumulate money when investing were comparatively volatile (e.g., markets) rather than safe (e.g., US bonds). In response to matching the "under the age of 40" to "age 30," the QA system may have qualified the "invest in US bonds" as a very unfeasible answer as a result of the evidentiary data. The QA system may accordingly have generated a feasibility factor for "invest in US bonds" of 0.01. Analyzing the feasibility of the answers like this, the QA system could generate feasibility factors for each of the answers. These feasibility factors may include the evidentiary data used to establish scores, either for eventual presentation to user or for other uses.

The set of answer feasibility factors may include a set of score modifiers. In embodiments, score modifiers may be elements which change the scores within the first set of scores to reflect the feasibility of the answers associated with those scores. To create these score modifiers, the QA system may gather a set of evidentiary data related to feasibility. In embodiments, this evidentiary data may be the evidentiary data described above. The QA system may gather this data from the areas of the corpus associated with the subset of candidate situations. The QA system may use NLP and concept-matching techniques as described herein to quantify the feasibility of each of the answers. This quantification may be translated into the score modifiers. For example, using the example above regarding the trip from Minneapolis to Detroit, the QA system may quantify that with unnecessary funds the feasibility of flying is low, and may adjust the flying answer score accordingly. The QA system may also quantify that with a car currently undergoing repairs, the feasibility of a driving answer is low, but possibly higher than flying as the repairs on the car may conclude in time. The score modifier for the driving answer may therein be created accordingly.

At block 360 a second set of candidate answers may be generated. The second set of answers may be generated using the set of answer feasibility factors as described herein. The QA system may use the first set of media (e.g., text or video answering the question) to establish a second set of media for the second set of answers. In such embodiments, the QA system may pull the media from the first set of answers and insert this media into the second set of answers. The QA system may then apply the set of score modifiers to the first set of scores to generate a second set of scores.

In embodiments, not all initial answers may be included in the second/final set of answers. In such embodiments, answers may be excluded if the score of the answer meet an exclusion criterion. In embodiments, an exclusion criterion is a fact pattern surrounding a score which, if meet, would prompt the QA system to remove the answer associated with the score from the second set of answers. The exclusion criterion may be a threshold feasibility. For example, if an answer is too infeasible, the QA system may remove that answer from the answer set entirely. In other embodiments, the exclusion criterion may relate to both the score, the number of answers, and the device the answers are being sent to. For example, if a user is engaging the QA system on a phone with limited storage and data capacity, the QA system may only send the two answers with the highest scores. However, if a user is engaging the QA system on a personal computer with no storage or data limitations, all answers may be returned.

The second set of media may be mapped to the second set of scores using the corresponding mapping between the first set of media and the first set of scores. For example, the QA system may receive an input of "get me directions to my house" and generate a first set of answers which include an answer of "map using highways" with media of a map over a highway and answer of "map using side roads" with media of a map over side roads. Using a relevancy analysis, the QA system may generate a highway score of 0.8 and a side roads score of 0.2 and map these scores to their respective answers and media. In a feasibility analysis 370 the QA system may identify candidate situation "user on a bike" as matching the contextual data (e.g., the user is asking for directions home while biking). In response to this match, the QA system may create score modifiers which modify score 0.8 to 0.05 and score 0.2 to 0.95. The QA system may determine the proper mapping between these new scores and the highway and side road media by referencing the mapping of the first set of answers.

In certain embodiments, the QA system may use the feasibility evidentiary data to create new sets of media and create brand new answers for the second set of answers to reflect a new option made apparent by the feasibility analysis. For example, in response to the input "get me directions to my house" the QA system may find a bike path to get home which was not relevant enough to be included in the first set of answers. Method 300 ends at block 399.

Figure 4:
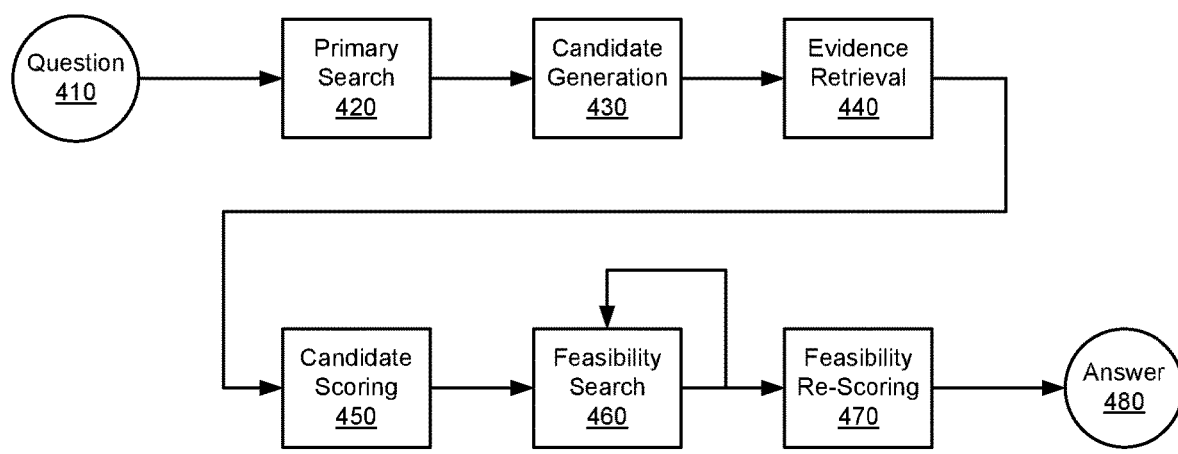
FIG. 4 depicts a logical pipeline for addressing questions according to embodiments.

FIG. 4 shows embodiments of a pipeline flow for managing answer feasibility. The pipeline flow may be a series of processes completed by a QA system as described herein. A QA system managing answer feasibility by performing the processes of FIG. 4 may also complete operations from method 300.

The pipeline may begin with a question being received by the QA system at block 410. The question from a user may be "what tires should I get for my truck." At block 420 the QA system may search a corpus related to tires for the make and model of the truck. At block 430 a set of relevant answers may be generated which includes the most popular tires, the most versatile tires, winter tires, and the cheapest tires. At block 440 the QA system may retrieve the evidence related to the advantages and disadvantages of the four answers. At block 450 the QA system may score answers per the relevancy of an answer to the original question. The most popular tires may be given the highest confidence score of 0.55, with the most versatile tires at 0.3, the winter tires at 0.1, and the cheapest tires at 0.05. While performing a feasibility search, the QA system may determine that winter tires are much more feasibility in northern states in winter and the cheapest tires are much more feasible on a tight budget. The QA system may check the data received with the question and see that contextual data verifies sufficient funds for all options, but there is no contextual data regarding the user's location. The QA system queries the user and gathers sufficient contextual information to determine that the user is in Minnesota. Searching through a feasibility corpus again, the QA system identifies Minnesota as a northern state and the current month as December. In response to establishing a feasibility factor related to location, the QA system rescores the winter tires as 0.75, the most popular tires as 0.14, the most versatile tires as 0.08, and the cheapest tires as 0.03. The QA system may then present this newly scored set of answers to the user.

The following example illustrates the methodology of FIG. 3 and pipeline flow of FIG. 4 according to embodiments of the present disclosure. The QA system may receive a text of "how do I treat my bee sting" along with contextual data "I am not allergic to bee stings." The QA system may use NLP techniques as described herein to identify this input as a query for ways to treat a bee sting. The QA system could use NLP techniques to find relevant portions of data from a corpus. For example, QA system may use NLP techniques to find areas of the corpus related to pain, insects, or allergies. The QA system may then compile media from the corpus into answers which reply to the input. For example, the QA system may compile media of texts "put ice on bee sting," "use anti-histamine medicine," "use an epinephrine auto-injector," and "go to the hospital."

The QA system may also generate scores (e.g., confidence scores) for these texts based on the relevancy of the answers as determined with NLP techniques. The QA system may generate these scores by analyzing the corpus with the NLP techniques described herein. The NLP techniques may be used to parse data from the corpus to determine the relevance of each of the answers. When determining relevance, the QA system may take into account such factors as the information conveyed, the strength of that conveyance, or the authority behind the conveyor.

For example, while searching the corpus for key words such as "bee sting" and "treating," the QA system may identify a medical publication from a prominent university which states "treating bee stings with ice is a sufficient treatment in the vast majority of cases." The QA system, using NLP techniques, may quantify characteristics of the publication such as the relevance of the segment (very high), the conviction of the segment (very high), or the authority of the segment (very high). The QA system may use the quantification of the publication and other portions of the corpus to assign a confidence score of 0.45 to the option of "put ice on bee sting." The QA system may continue this process until it has generated scores of 0.45, 0.02, and 0.08, for the answers of "use anti-histamine medicine," "use an epinephrine auto-injector," and "go to the hospital," respectively. The QA system may compile media and scores into a mapped set (e.g., portions of media are mapped to particular scores) to generate the first set of answers.

In response to generating the first set of answers, the QA system may select to analyze feasibility for this question. In embodiments, the feasibility of an answer may be how practicable an answer is given the totality of circumstances surrounding the question. The QA system may determine if an answer is feasible by determining if the answer can be qualified as applicable to the situation of the question. The situation of the question, identified by the QA system through the contextual data, may make answers more or less feasible or achievable as a results of the resources and handicaps of the party which asked the question. In embodiments, by analyzing feasibility, the QA system may identify if the actions suggested by an answer are a reasonable response to the question.

When selecting to analyze feasibility, the QA system may first map the question to a section of the corpus. The section/subset of the corpus may be the portion where the answers were mined. The QA system may map the question use NLP techniques as described herein. The QA system may compare this subset to one or more contextually sensitive categories. In embodiments, the contextually sensitive categories may be categories from a predefined list of categories. The predefined list of categories might be areas of the corpus where it is probable that certain answers are more or less feasible than other answers. For example, if "healthcare" is a predefined class, the QA system may identify the health implications within "how do I treat my bee sting" and classify this question as being a contextually sensitive category.

In certain embodiments, a contextually sensitive category may identified upon mapping question to subsection of corpus as an area of the corpus where certain answers are more or less feasible than other answers. The QA system may use NLP techniques as described herein to compare the subset of the corpus to contextually sensitive categories. For example, the QA system may identify two answers (e.g., "use an epinephrine auto-injector" and "go to the hospital") which have qualifying characteristics (e.g., being allergic to bees, being elderly, being an infant) associated with the answers. As a result of identifying these two answers, the QA system may classify the subset of the corpus as a contextually-sensitive category. The QA system may accordingly select to analyze feasibility.

The QA system may identifying candidate situations as described herein which correspond to the generated answers. In embodiments, the QA system may use NLP techniques to parse through the corpus to find these candidate situations which could impact the feasibility of an answer from the corpus. The QA system may then quantify this information in much the same way as relevance was accounted for above (e.g., what is the information conveyed, what is the strength of that conveyance, what is the authority behind the conveyor). For example, the corpus could include "medical attention may be needed if an elderly patient suffers ten or more bee stings at one time." The QA system may identify this and create a candidate situation of "elderly user stung 10 times." This candidate situation may correspond to the candidate answers and lower the feasibility of all answers except for "go to the hospital." Other candidate situations can include "user is allergic" or "user is healthy young adult without allergies." The QA system may compile these candidate situations into a set (e.g., the set of candidate situations). In embodiments, the set of candidate situations may include the situations, the corresponding answers, and the section of the corpus which generated the situations (e.g., evidentiary data).

The QA system may identify the candidate situations which apply to this question. Identifying applicable situations may include determining situations which correspond to the contextual data. The QA system may identify if a situation corresponds to the contextual data by comparing set of terms/phrases of the situations to the contextual data using NLP techniques as defined herein. If the sets of terms belong to the same linguistic class, the QA system may identify the candidate situation as applicable to the question. For example, the QA system could take a phrase "I am not allergic" from the contextual data and identify it is corresponding to candidate situation "user is allergic," due to the use by both phrases of the word "allergic." The QA system may then compare the two phrases. After comparing these two, the QA system may select not to classify these two term sets as belonging to the same concept, as the use of the word "not" signifies that the underlying concepts/meaning are diametrically opposed to each other. QA system may accordingly select to not identify candidate situation "user is allergic" as part of the subset of candidate situations.

In embodiments, a portion of contextual data may not initially be available for the QA system to compare to the candidate situations. In such embodiments, the QA system may detect that there is no portion of the contextual data which corresponds to one of the candidate situations. For example, when the QA system attempts to find contextual data which corresponds to the candidate situations "elderly user stung 10 times" and "user is healthy young adult without allergies," the QA system may detect that no contextual data identifies either the age of the user or the number of times the user was stung. In response to this determination, the QA system may gather the relevant contextual data. For example, the QA system may query a user database and gather a user age of 75 years. The QA system may also query user directly with "how many times were you stung" and receive an answer of "11." The QA system may add this contextual data to the master set of contextual data. With this new contextual data, the QA system may identify that candidate state "user is healthy young adult without allergies" does not apply to the question, but "elderly user stung 10 times" does.

The QA system may use the subset of candidate situations to determine feasibility. In this example, only one candidate situation ("elderly user stung 10 times") was identified as applicable, so the QA system may use this candidate situation to determine the feasibility of the answers. In other embodiments, numerous candidate situations may be part of the subset. The QA system may signify the feasibility of the answers with feasibility factors. The feasibility factors may include a score for the answers (e.g., if a score for the answer was not previously generated), a score modifier for the answers (e.g., if a score for the answer was previously generated), or evidentiary data for the scores/score modifiers.

The QA system may gather, from the corpus, a set of feasibility evidentiary data related to the identified candidate situation. For example, the QA system could gather data from medical publications which suggest that patients over the age of 65 be brought to an urgent care facility as soon as possible after being stung more than ten times. In embodiments, the feasibility evidentiary data may be the same data used to identify the initial set of candidate situations. In other embodiments, the feasibility evidentiary data may be data gathered when determining how relevant answers were to the question.

The QA system may use NLP techniques as described herein to determine a set of score modifiers for the scores of the answers. The QA system may use the feasibility evidentiary data to determine the score modifiers. For example, the QA system may quantify the evidence as signifying the answer "go to the hospital" as feasible, and signifying the answers "put ice on bee sting," "use anti-histamine medicine," or "use an epinephrine auto-injector" as unfeasible. Accordingly, the QA system may determine a set of score modifiers for the first set of scores (e.g., 0.45 for ice, 0.45 for medicine, 0.02 for injector, and 0.08 for hospital) of −0.41 for ice, −0.41 for medicine, −0.01 for injector, and +0.82 for hospital.

The QA system may generate a second set of answers. The QA system may use the set of answer feasibility factors and the first set of answers to create the second set of answers. The QA system may establish the media for the second answers (e.g., the second set of media) by pulling the data from original media (e.g., the first set of media) and inserting this data into the second set. In this case, the media from the original media was "put ice on bee sting," "use antihistamine medicine," "use an epinephrine auto-injector," and "go to the hospital." The QA system may pull the texts from each of the four segments of media and create four answers with the same media for the media of the second set of answers.

The QA system may generate the second set of scores for the second set of answers. The QA system may apply the score modifiers to the original scores to generate the final scores. For example, the QA system may apply the score modifiers of −0.41 for ice, −0.41 for medicine, −0.01 for injector, and +0.82 for hospital and apply them to the original scores of 0.45 for ice, 0.45 for medicine, 0.02 for injector, and 0.08 for hospital. Doing so, the QA system may generate final scores of 0.04 for ice, 0.04 for medicine, 0.01 for injector, and 0.9 for hospital.

The QA system may map the second set of media to the second set of scores. The QA system may use the mapping of the first set of answers to complete this mapping. For example, the QA system originally mapped the score of 0.45 to "put ice on bee sting." The QA system may reference this mapping and map the modified score of 0.04 to the copied media of "put ice on bee sting." Similarly, "go to the hospital" may be mapped to 0.9, "use anti-histamine medicine" may be mapped to 0.04, and "use an epinephrine auto-injector" may be mapped to 0.01.

In embodiments, the QA system may remove some answers from the second set of answers. The QA system may remove answers when scores of those answers meet an exclusion criterion. In embodiments, an exclusion criterion could be a score meeting a certain threshold. For example, a user could specify that, when using the QA system on a certain device (e.g., a cell phone), the QA system may only include those scores surpassing a threshold of 0.02; any score under 0.02 would be removed from the answer set. The QA system may identify the score for "use an epinephrine auto-injector" as 0.01, which is below the threshold of 0.02. In response to the score dropping below 0.02, the QA system may remove the answer "use an epinephrine auto-injector" from the answer set.

Once a final answer set has been determined, the QA system may provide the answers to the user. The QA system may provide the text and scores from the answers to the user. In embodiments, QA system could include the evidence behind the final scores. In certain embodiments, QA system may include communication links as part of final answer. For example, the QA system may display text of "Going to hospital is the best option, with a confidence score of 0.9. The options of putting ice on bee sting or using antihistamine medicine are both scored at 0.04. The attached folders may be opened to see both the evidence behind these scores and phone numbers for nearby hospitals."

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in the computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, via a network, a question and a set of contextual data associated with the question, wherein the contextual data includes information about a user and the contextual data is retrieved automatically from one or more external databases in response to receiving the question;
   generating a set of answers for the received question by analyzing a corpus using natural language processing;
   scoring each answer in the set of answers with a respective score based on a respective relevancy of each answer to the question;
   gathering a set of feasibility evidentiary data associated with the set of answers;
   mapping the question to a subset of the corpus using natural language processing;
   comparing the subset of the corpus to a set of contextually-sensitive categories to identify concepts of the question that match concepts of one of the contextually-sensitive categories;
   determining a respective numerical feasibility factor for each answer in the set of answers based on the contextual data and the set of feasibility evidentiary data, wherein determining the respective numerical feasibility factor for each answer is further based on the concepts of the contextually-sensitive category that matches the concepts of the question;
   modifying the respective score of each answer using the respective numerical feasibility factor for each answer in the set of answers; and
   displaying, on a device of the user, each answer in the set of answers together with the respective modified score.

2. The method of claim 1, wherein comparing the subset of the corpus to the set of contextually-sensitive categories is based on semantic similarity, syntactic analysis, and ontological matching.

3. The method of claim 1, wherein a first portion of the contextual data is retrieved from the one or more external databases in response to receiving the question; and
   wherein the method further comprises querying the user for a second portion of the contextual data in response to comparing the first portion of the contextual data to the set of feasibility evidentiary data.

4. The method of claim 1, wherein determining the respective numerical feasibility factor comprises determining the respective numerical feasibility factor for each answer in response to receiving user input requesting feasibility analysis of each answer.

5. A system comprising:
   a network interface; and
   a processor communicatively coupled to the network interface and the display, wherein the processor is configured to:
   receive, via the network interface, a question and a set of contextual data associated with the question, wherein the contextual data includes information about a user, and wherein the processor is configured to retrieve the contextual data automatically from one or more external databases in response to receiving the question;
   generate a set of answers for the received question by analyzing a corpus using natural language processing;
   score each answer in the set of answers with a respective score based on a respective relevancy of each answer to the question;
   gather a set of feasibility evidentiary data associated with the set of answers;
   map the question to a subset of the corpus using natural language processing; and
   compare the subset of the corpus to a set of contextually-sensitive categories to identify concepts of the question that match concepts of one of the contextually-sensitive categories;
   determine a respective numerical feasibility factor for each answer in the set of answers based on the contextual data and the set of feasibility evidentiary data, wherein the processor is further configured to determine the respective numerical feasibility factor for each answer based on the concepts of the contextually-sensitive category that matches the concepts of the question;
   modify the respective score of each answer using the respective numerical feasibility factor for each answer in the set of answers; and
   output each answer in the set of answers for display together with the respective modified score on a device of the user.

6. The system of claim 5, wherein the processor is configured to compare the subset of the corpus to the set of contextually-sensitive categories based on semantic similarity, syntactic analysis, and ontological matching.

7. The system of claim 5, wherein the processor is configured to:
   retrieve a first portion of the contextual data from the one or more external databases in response to receiving the question; and
   query the user for a second portion of the contextual data in response to comparing the first portion of the contextual data to the set of feasibility evidentiary data.

8. The system of claim 5, wherein the processor is configured to determine the respective numerical feasibility factor in response to receiving user input requesting feasibility analysis of the set of answers.

9. A computer program product comprising a non-transitory computer readable storage medium having a computer readable program stored therein, wherein the computer readable program, when executed by a processor, causes the processor to:

receive, via a network interface, a question and a set of contextual data associated with the question, wherein the contextual data includes information about a user and the contextual data is retrieved automatically from one or more external databases in response to receiving the question;

generate a set of answers for the received question by analyzing a corpus using natural language processing;

score each answer in the set of answers with a respective score based on a respective relevancy of each answer to the question;

gather a set of feasibility evidentiary data associated with the set of answers;

map the question to a subset of the corpus using natural language processing;

compare the subset of the corpus to a set of contextually-sensitive categories to identify concepts of the question that match concepts of one of the contextually-sensitive categories;

determine a respective numerical feasibility factor for each answer in the set of answers based on the contextual data and the set of feasibility evidentiary data, wherein determining the respective numerical feasibility factor for each answer is further based on the concepts of the contextually-sensitive category that matches the concepts of the question;

modify the respective score of each answer using the respective numerical feasibility factor for each answer in the set of answers; and output each answer in the set of answers for display together with the respective modified score on a device of the user.

10. The computer program product of claim 9, wherein the computer readable program is further configured to cause the processor to compare the subset of the corpus to the set of contextually-sensitive categories based on semantic similarity, syntactic analysis, and ontological matching.

11. The computer program product of claim 9, wherein the computer readable program is further configured to cause the processor to:

retrieve a first portion of the contextual data from the one or more external databases in response to receiving the question; and query the user for a second portion of the contextual data in response to comparing the first portion of the contextual data to the set of feasibility evidentiary data.

* * * * *